United States Patent
Ray et al.

(10) Patent No.: US 11,424,958 B2
(45) Date of Patent: Aug. 23, 2022

(54) MANAGING TRANSMISSION CONTROL PROTOCOL (TCP) MAXIMUM SEGMENT SIZE (MSS) VALUES FOR MULTIPLE TUNNELS SUPPORTED BY A COMPUTING SITE GATEWAY

(71) Applicant: VMWARE, INC., Palo Alto, CA (US)

(72) Inventors: Sarthak Ray, Pune (IN); Sourabh Bhattacharya, Pune (IN); Awan Kumar Sharma, Pune (IN); Yong Wang, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 28 days.

(21) Appl. No.: 16/866,621

(22) Filed: May 5, 2020

(65) Prior Publication Data

US 2021/0281442 A1 Sep. 9, 2021

(30) Foreign Application Priority Data

Mar. 5, 2020 (IN) .............................. 202041009472

(51) Int. Cl.
| | |
|---|---|
| H04L 12/46 | (2006.01) |
| H04L 7/00 | (2006.01) |
| H04L 69/16 | (2022.01) |
| H04L 12/66 | (2006.01) |
| H04L 9/40 | (2022.01) |
| H04L 47/36 | (2022.01) |
| H04L 9/06 | (2006.01) |

(52) U.S. Cl.
CPC ........ *H04L 12/4633* (2013.01); *H04L 7/0008* (2013.01); *H04L 9/0618* (2013.01); *H04L 9/0643* (2013.01); *H04L 12/4641* (2013.01); *H04L 12/66* (2013.01); *H04L 47/36* (2013.01); *H04L 63/0428* (2013.01); *H04L 69/16* (2013.01)

(58) Field of Classification Search
CPC . H04L 12/4633; H04L 7/0008; H04L 9/0618; H04L 9/0643; H04L 12/4641; H04L 12/66; H04L 47/36; H04L 63/0428; H04L 69/16
USPC .......................................... 370/464, 498, 503
See application file for complete search history.

(56) References Cited

U.S. PATENT DOCUMENTS

| | | | | |
|---|---|---|---|---|
| 2012/0243410 | A1* | 9/2012 | Vedula | H04L 41/5025 370/235 |
| 2013/0223337 | A1* | 8/2013 | Choo | H04W 60/00 370/328 |
| 2013/0322255 | A1* | 12/2013 | Dillon | H04L 43/0888 370/236 |
| 2015/0003449 | A1* | 1/2015 | Cui | H04L 49/9057 370/389 |

(Continued)

*Primary Examiner* — Obaidul Huq

(57) ABSTRACT

Described herein are systems, methods, and software to manage maximum segment size (MSS) values associated with multiple tunnels according to an implementation. In one implementation, a gateway may obtain a Transmission Control Protocol (TCP) synchronize (SYN) packet from a computing node. The gateway may identify a tunnel associated with the TCP SYN packet, determine a maximum segment size (MSS) value based on the overhead associated with the tunnel, and replace a first MSS value in the TCP SYN packet with the MSS value determined by the gateway. Once added, the gateway may encapsulate the TCP SYN packet and communicate the packet to a second gateway.

18 Claims, 7 Drawing Sheets

(56) References Cited

U.S. PATENT DOCUMENTS

2015/0382240 A1* 12/2015 Hecht .................... H04L 69/18
370/316
2020/0259758 A1* 8/2020 Vytla ...................... H04L 41/16

* cited by examiner

| TUNNEL 512 | PMTU 514 | PARAMETERS 516 | MSS VALUE 518 |
|---|---|---|---|
| FIRST TUNNEL 140 | PMTU 310 | PARAMETERS 320 | VALUE 530 |
| SECOND TUNNEL 141 | PMTU 311 | PARAMETERS 321 | VALUE 531 |

NEW PARAMETERS 510

| TUNNEL 512 | PMTU 514 | PARAMETERS 516 | MSS VALUE 518 |
|---|---|---|---|
| FIRST TUNNEL 140 | PMTU 310 | PARAMETERS 320 | VALUE 530 |
| SECOND TUNNEL 141 | PMTU 311 | PARAMETERS 510 | VALUE 532 |

MANAGING TRANSMISSION CONTROL PROTOCOL (TCP) MAXIMUM SEGMENT SIZE (MSS) VALUES FOR MULTIPLE TUNNELS SUPPORTED BY A COMPUTING SITE GATEWAY

RELATED APPLICATIONS

Benefit is claimed under 35 U.S.C. 119(a)-(d) to Foreign Application Serial No. 202041009472 filed in India entitled "MANAGING TRANSMISSION CONTROL PROTOCOL (TCP) MAXIMUM SEGMENT SIZE (MSS) VALUES FOR MULTIPLE TUNNELS SUPPORTED BY A COMPUTING SITE GATEWAY" on Mar. 5, 2020, by VMWARE, Inc., which is herein incorporated in its entirety by reference for all purposes.

TECHNICAL BACKGROUND

Organizations may often employ multiple computing sites to provide extended functionality across multiple locations and to provide access to additional computing elements. In some implementations, an organization may extend a layer two network across the computing sites or connect layer three network(s), wherein the extension or stretching of the network permits physical computing systems and virtual nodes, such as virtual machines or containers, to communicate over the same broadcast domain, removing the need to re-architect your network topology. In some implementations, to provide the extension of the network across multiple locations, gateways may be implemented at each of the computing sites that can identify packets directed at another computing site, encapsulate the packets, and forward the packets to the other computing site. Once received by a gateway at the destination computing site, the gateway may decapsulate the packet and forward the packet to the desired virtual node.

Although extending layer two networks provides an efficient and effective method for virtual nodes across multiple sites to communicate, difficulties can arise in the construction of the packets that are communicated between the computing sites. In particular, due to the encapsulation, the size of the packets communicated between peers may cause issues in relation to the maximum transmission unit (MTU) for the packets. This issue can be compounded when a gateway supports tunnels to multiple other computing sites.

SUMMARY

The technology described herein manages the communication of packets across extended layer two networks or connect a layer three network. In one implementation, a gateway at a first computing site obtains a Transmission Control Protocol (TCP) synchronize (SYN) packet from a computing node at the first computing site and identifies a tunnel associated with the TCP SYN packet from a plurality of tunnels, wherein the gateway supports the plurality of tunnels using a common network interface. The gateway further determines a maximum segment size (MSS) value for the TCP SYN packet based on tunneling overhead associated with one or more encryption parameters for the tunnel and replaces a first MSS value calculated by the computing node with the MSS value in the TCP SYN packet. The gateway also encapsulates the TCP SYN packet in a second packet and communicates the second packet to a destination gateway.

BRIEF DESCRIPTION OF THE DRAWINGS

FIGS. 5A and 5B illustrate an operational scenario of updating a data structure for MSS values according to an implementation.

DETAILED DESCRIPTION

Figure 1:
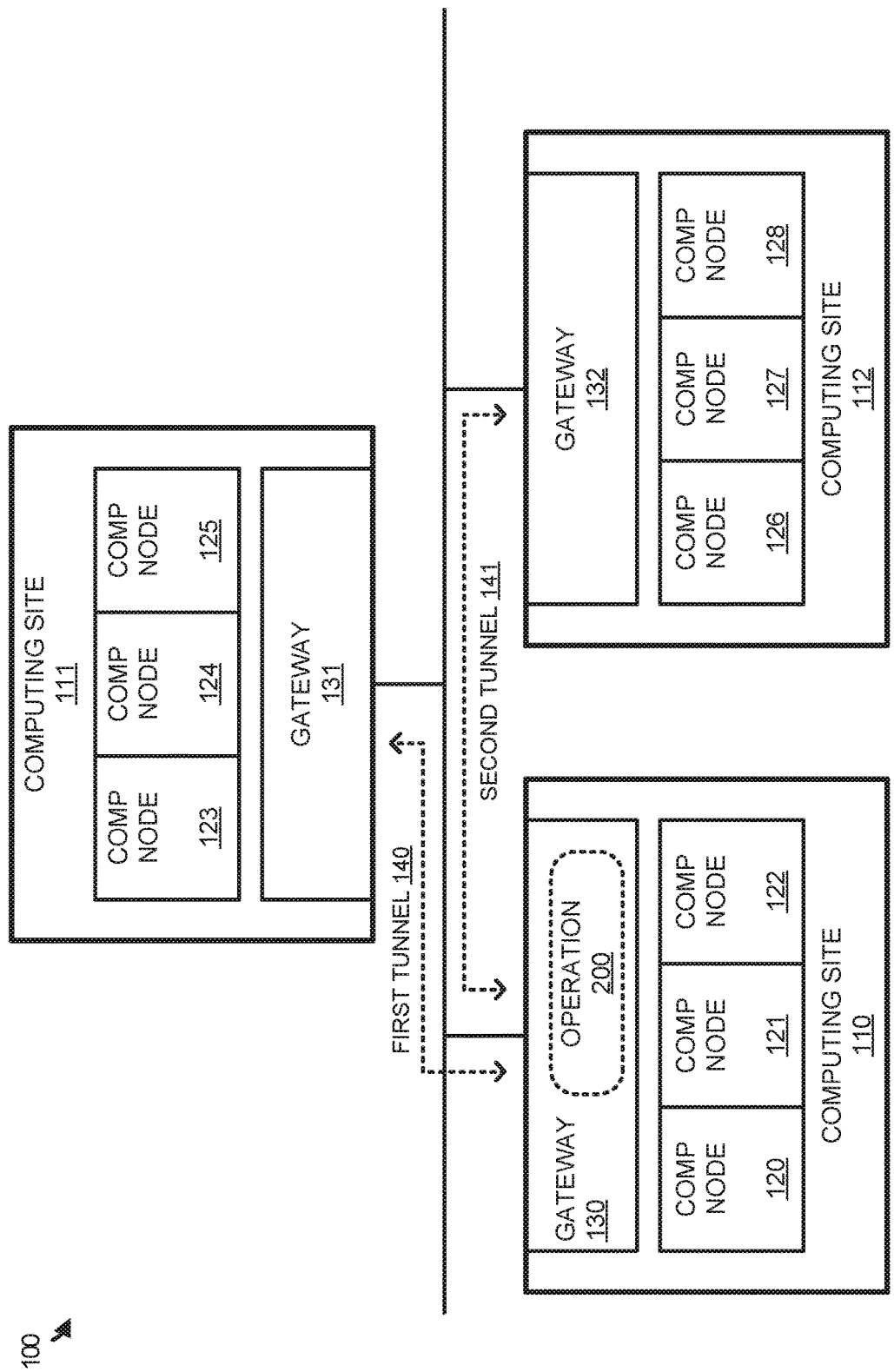
FIG. 1 illustrates a computing network to manage maximum segment size (MSS) values for multiple tunnels according to an implementation.

FIG. 1 illustrates a computing network 100 to manage maximum segment size (MSS) values for multiple tunnels according to an implementation. Computing network 100 includes computing sites 110-112, which further include gateways 130-132 and computing (comp) nodes 120-128. Gateway 130 may provide extended layer two networking to gateway 131 using first tunnel 140 and may provide extended layer two networking to gateway 132 using second tunnel 141. In some examples, gateway 130 may be used to connect layer three network(s) across computing sites. Computing nodes 120-128 may include virtual machines, containers, or some other containerized endpoint. Computing nodes 120-128 may also be representative of physical computing systems, such as desktop computing systems, laptop computing systems, and the like. Gateway 130 is configured to provide at least operation 200 that is described in FIG. 2.

In operation, an organization may employ computing sites 110-112 to provide various functionality across different locations and provide access to additional computing nodes and resources. In providing connectivity for computing sites 110-112, gateways 130-132 are used to extend a layer two network to the various computing sites using first tunnel 140 and second tunnel 141, wherein the tunnels may be used to encapsulate data from a computing node at a first computing site and communicate the data to the second computing site. In some implementations, the encapsulation of the packet may include encryption operations for the packets, wherein the encryption operations may encrypt the data, provide additional header information, or provide some other operation with respect to encapsulating the data. The encapsulation configuration may be different for each of the computing sites, wherein first tunnel 140 may use first encryption parameters and tunnel 141 may use second encryption parameters. For example, computing node 120 at computing site 110 may use first tunnel 140 with first encryption parameters to communicate with computing node 123, while computing node 121 may use second tunnel 141 with second encryption parameters to communicate with computing node 126. The encryption parameters may include a hash function type or a key encryption cipher type in some examples.

In some implementations, to establish a connection with another computing node, a computing node may transmit a Transmission Control Protocol (TCP) synchronize (SYN) packet that defines parameters for the communication. This TCP SYN packet may indicate a maximum segment size (MSS) value, wherein the MSS value comprises a parameter in the options field of the TCP header that specifies the largest amount of data that a communications device can receive in a single TCP segment. However, due to encapsulation performed by gateways 130-132, an MSS value generated by a computing node that is destined for another computing node at another computing site may not reflect the space available for data in the communications.

Here, when a TCP SYN packet is generated by a computing node of computing nodes 120-122 for another computing node at computing sites 111-112, gateway 130 may be used to identify an appropriate MSS value for the packet and insert the MSS value for the packet. Gateway 130 may determine the MSS value based on the Path Maximum Transmission Unit (PMTU) between gateway 130 and the receiving gateway of gateways 131-132 and may further determine the MSS value based on header overhead caused by the tunnel. In some implementations, the tunnel overhead may be dynamic based on the encryption parameters used for the encapsulation, wherein the encryption parameters may comprise a hash function type or a key encryption cipher type. Each of the encryption parameters may change the size of the overhead associated with encapsulation of the packet. As a result, a communication over first tunnel 140 may require a first sized header and associated MSS value, while a communication over second tunnel 141 may require a second sized header and associated MSS value.

Figure 2:
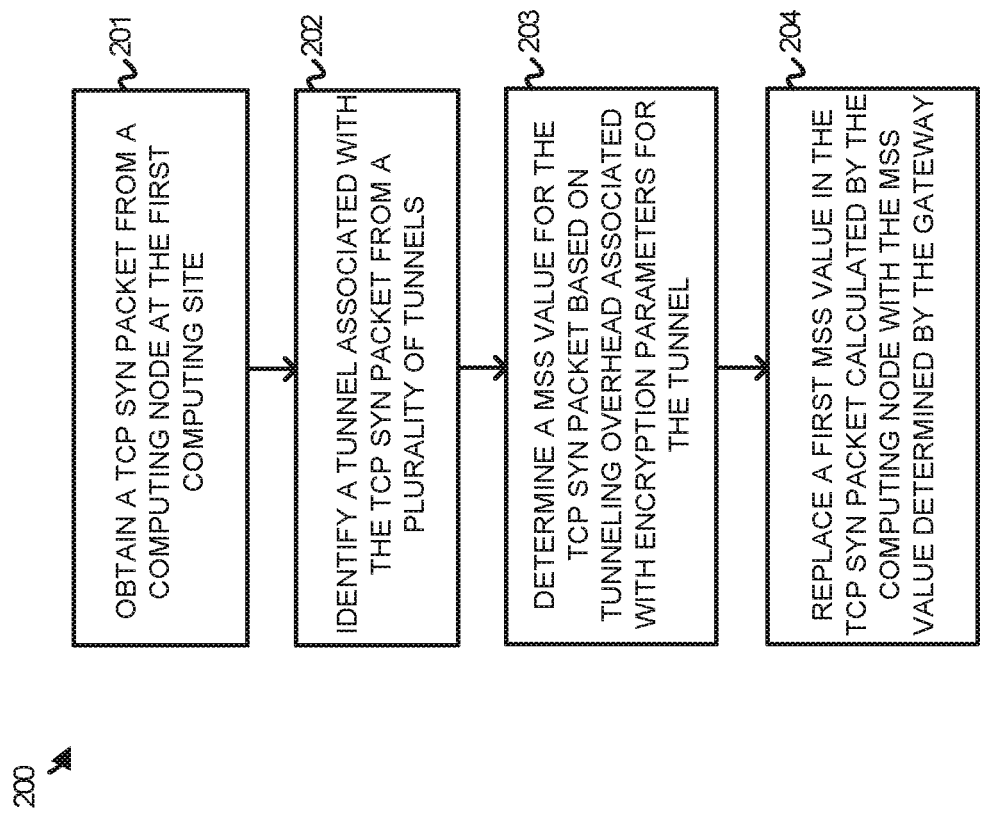
FIG. 2 illustrates an operation to support MSS values for multiple tunnels according to an implementation.

FIG. 2 illustrates an operation 200 to support MSS values for multiple tunnels according to an implementation. The steps of operation 200 are referenced parenthetically in the paragraphs that follow with reference to systems and elements of computing network 100 of FIG. 1. Although demonstrated with respect to gateway 130, it should be understood that gateways 131-132 may implement a similar operation.

As depicted, gateway 130 obtains (201) a Transmission Control TCP SYN packet from a computing node at the first computing site. For example, computing node 120 may generate a TCP SYN packet to establish a connection with computing node 123 at computing site 111. In response to obtaining the TCP SYN packet, gateway 130 identify (202) a tunnel associated with the TCP SYN packet from a plurality of tunnels, wherein the gateway supports the plurality of tunnels using a common network interface. In some implementations, gateway 130 may include a single network interface that is used to extend at least one layer two network to other computing sites using multiple tunnels or connect a layer three network to multiple computing sites. Each of the tunnels may use Internet protocol Security (IPSec), Generic Routing Encapsulation (GRE), Virtual Extensible Local Area Network (VXLAN), Generic Network Virtualization Encapsulation (GENEVE), or some other encapsulation protocol.

In addition to identifying a tunnel associated with the TCP SYN packet, gateway 130 determines (203) an MSS value for the TCP SYN packet based on tunneling overhead associated with one or more encryption parameters for the tunnel. In particular, first tunnel 140 may be associated with first encryption parameters, such an Advanced Encryption Standard (AES) 128 Cipher Block Chaining (AES-128-CBC) for the payload, while second tunnel 141 may be associated with second encryption parameters, such as an AES-128-Galois/Counter Mode (AES-128-GCM) cipher for the payload. As a result, the overhead required for each of the tunnels may be different to accommodate the required data for the various encryption parameters. In some implementations, the MSS value for each of the tunnels may be calculated at the time a TCP session is requested, however, it should be understood that the MSS values may be calculated periodically, based on a IPSec rekey event for the tunnel, or at some other interval.

Once the MSS value is calculated, gateway 130 may replace (204) a first MSS value in the TCP SYN packet calculated by the computing node with the MSS value determined by the gateway. For example, when computing node 120 communicates a TCP SYN packet for delivery to computing node 123, computing node 120 may use an MSS value associated with the PMTU for a locally communicated packet (i.e., a packet that is not required to be encapsulated). Once the TCP SYN packet is received by gateway 130, gateway 130 may determine a new MSS value based on the PMTU associated with first tunnel 140 and the encryption parameters associated with first tunnel 140 and replace the MSS value with the new MSS value. Gateway 130 may further encapsulate the TCP SYN packet in a second packet and communicate the second packet to gateway 131. After receiving the packet, gateway 131 may decapsulate the packet and forward the packet to destination computing node 123, wherein computing node 123 may generate segments based on the MSS value updated by gateway 130.

In some implementations, the encryption and PMTU configurations associated with tunnels may change in computing network 100. Consequently, gateway 130 may update the MSS values associated with a corresponding tunnel at various intervals, wherein the intervals may be periodic, when a new TCP session is requested, during an IPSec rekey, or at some other interval. In some implementations, when a new MSS value is required, the value is only incorporated into new TCP sessions, however, the gateway may tear down existing sessions, requiring the computing nodes to initiate a new session with the newly identified MSS value.

Figure 3:
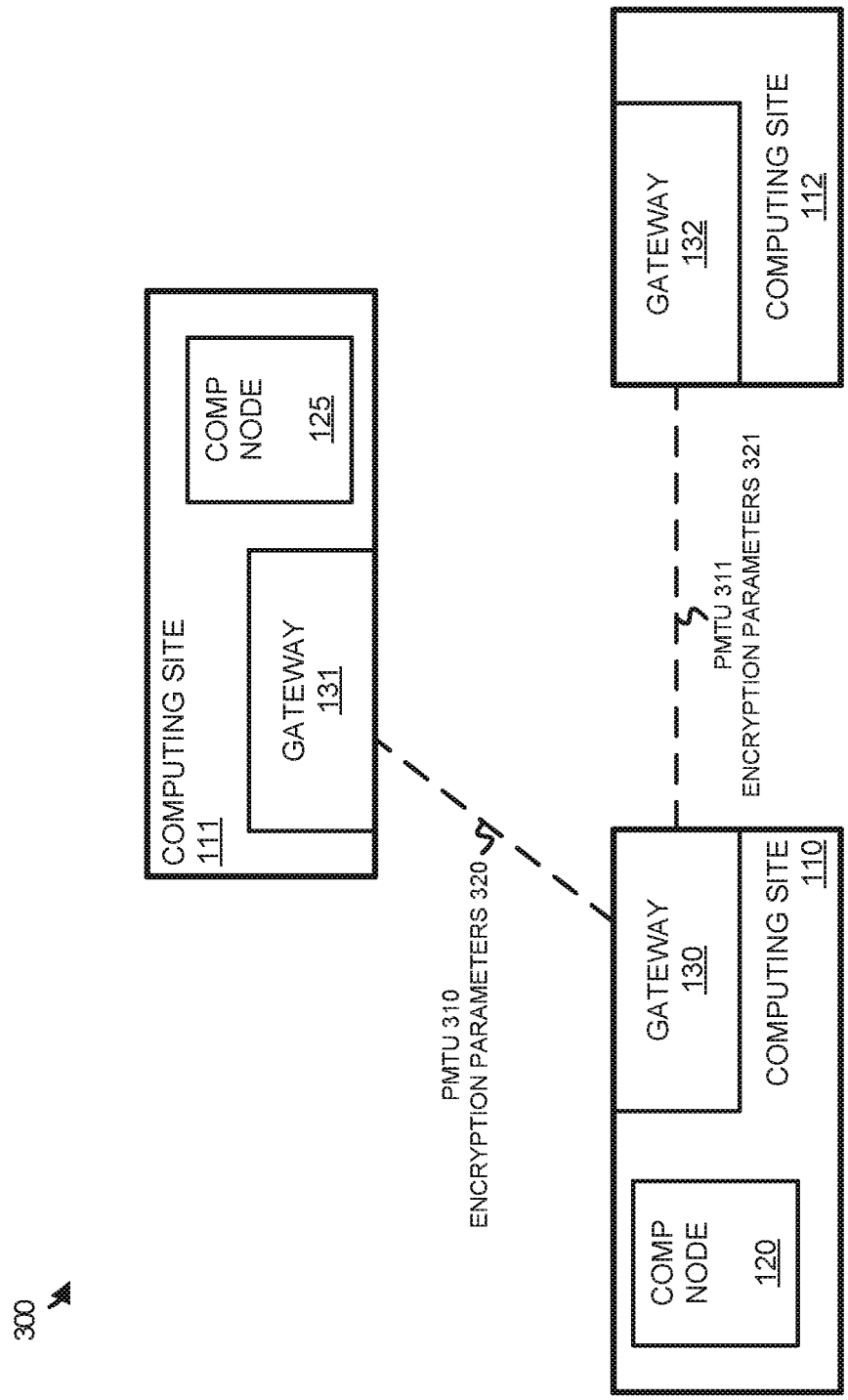
FIG. 3 illustrates an overview of tunnel connections between computing sites according to an implementation.

FIG. 3 illustrates an overview 300 of tunnel connections between computing sites according to an implementation. Overview 300 includes computing sites 110-112, gateways 130-132, tunnels 140-141, and computing nodes 120 and 125 from computing network 100 of FIG. 1. Overview 300 further includes PMTUs 310-311 and encryption parameters 320-321.

As described herein, gateway 130 may be used to provide multiple private networking tunnels 140-141 to extend at least one layer two network to other computing sites. These tunnels may each be allocated a different configuration that can result in different MSS values for each of the different tunnels. In some implementations, the MSS values may be based on the PMTU for the connection between the gateways and the encryption parameters used for the connection. As a result, because tunnel 140 is associated with PMTU 310 and encryption parameters 320, tunnel 140 may have a different MSS value than tunnel 141 with PMTU 311 and encryption parameters 321. The MSS value may be calculated periodically for each of the tunnels, determine when a TCP session is requested, determined during an IPSec rekey, or determined at any other interval.

Figure 4:
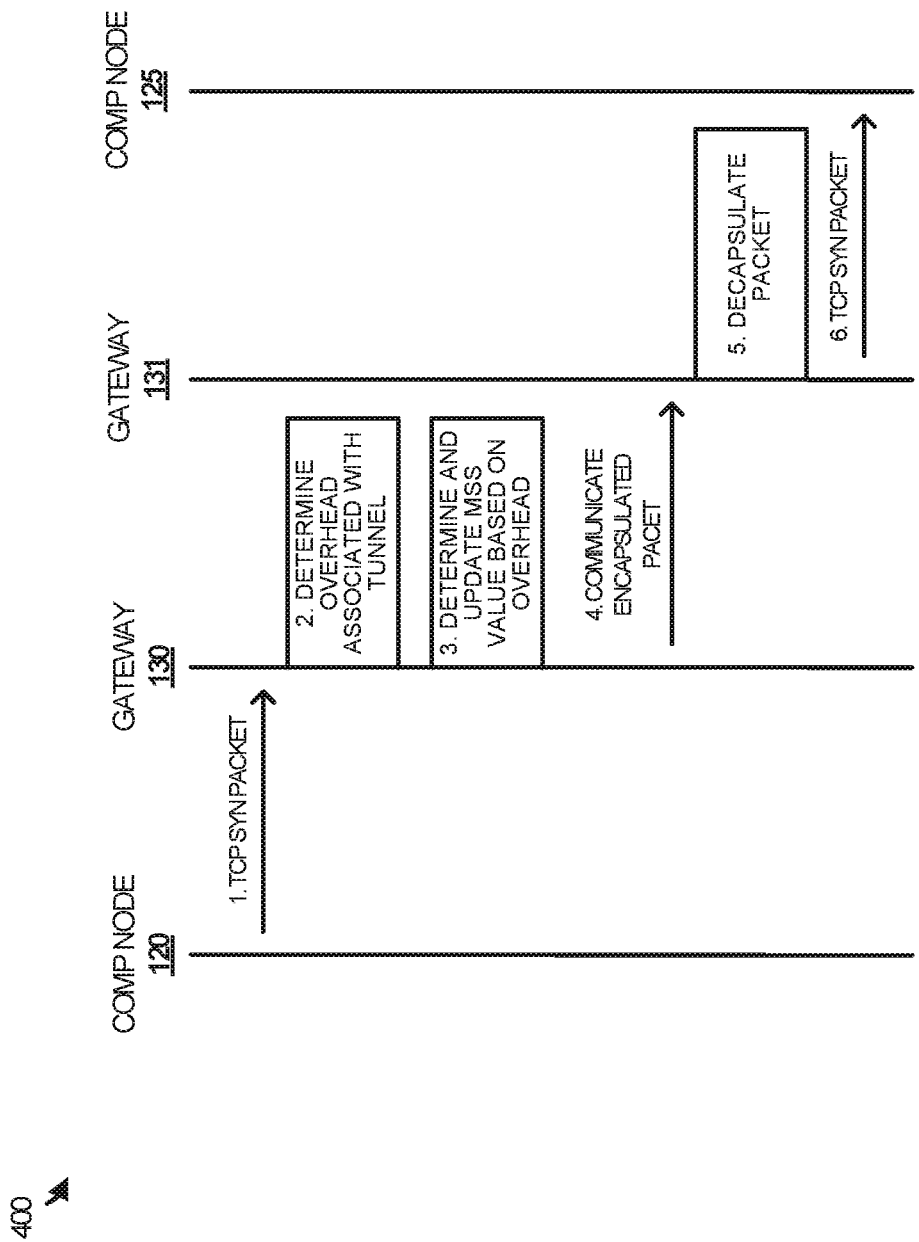
FIG. 4 illustrates a timing diagram of transmitting a Transmission Control Packet (TCP) synchronize (SYN) packet according to an implementation.

FIG. 4 illustrates a timing diagram 400 of transmitting a Transmission Control Packet (TCP) synchronize (SYN) packet according to an implementation. Timing diagram 400 includes computing nodes 120 and 125, and gateways 130-131.

In operation, computing node 120 generates, at step 1, a TCP SYN packet that is received by gateway 130. Gateway 130 identifies that the TCP SYN packet is associated with a tunnel of a plurality of layer two tunnels supported by gateway 130 and determines, at step 2, overhead associated with the tunnel. The overhead may be based on encryption parameters, such as a hash function type or a key encryption cipher type, addressing requirements for the tunneling packet, or some other overhead requirement for the encapsulation packet. Once the overhead is identified, gateway 130 determines and updates, at step 3, an MSS value for the TCP SYN packet based at least one the overhead associated with the corresponding tunnel. Here, because computing node 120 is communicating with computing node 125, the PMTU and the encryption parameters associated with tunnel 140 may be used to calculate the encapsulation overhead and the MSS value.

In some implementations, when computing node 120 generates the TCP SYN packet, computing node 120 may insert a first MSS value based on the PMTU between the computing node and the gateway. Once the packet is received, gateway 130 may determine a second MSS value based on the overhead associated with the encapsulation of the packet and replace the first MSS value with the second MSS value. After replacing the MSS value and encapsulating the TCP SYN packet, the encapsulated packet is communicated to gateway 131, at step 4.

In response to receiving the packet, gateway 131 may decapsulate the packet, at step 5, and communicate the decapsulated TCP SYN packet to computing node 125, at step 6. Once communicated to computing node 125, computing node 125 may communicate with computing node 120 based at least in part on the modified MSS value contributed by gateway 130.

Although demonstrated in the previous examples as updating the MSS value in the TCP SYN value at the outbound gateway, it should be understood that the replacement may occur at the inbound gateway in some examples. For example, when computing node 125 generates a TCP SYN packet to be delivered to computing node 120, gateway 131 may encapsulate the TCP Syn packet and forward the encapsulated packet to gateway 130. Once received, gateway 130 may determine a tunnel associated with the packet, determine a new MSS value based on the overhead caused by at least the encryption parameters, and replace the included MSS value with the new MSS value prior to forwarding the TCP SYN packet to computing node 120. In some examples, gateway 130 may obtain information about the various tunnels supported by gateway 130. This information may include PMTU information for each of the communication paths, (e.g., the path for computing node 120 to communicate with computing node 125), encryption parameters for the tunnel, or any other information associated with the tunnel. Thus, gateway 130 may generate the new MSS value to avoid fragmentation for return communications from computing node 120 to computing node 125.

FIGS. 5A and 5B illustrate an operational scenario of updating a data structure for MSS values according to an implementation. FIG. 5A includes columns for tunnel 512, PMTU 514, parameters 516, and MSS value 518. The columns include tunnels 140-141 from computing network 100 of FIG. 1, PMTUs 310-311 and parameters 320-321 from overview 300 of FIG. 3, and values 530-531. FIG. 5B includes the same elements from FIG. 5A but replaces parameters 321 with new parameters 510 and value 531 with value 532.

As described herein, a gateway may calculate an MSS value for each tunnel supported by the gateway to prevent fragmentation in the communications by computing nodes over the gateway. Referring to FIG. 5A, values 530-531 are generated based at least on PMTUs 310-311 and parameters 320-321, wherein the PMTUs define the size of the largest protocol data unit that can be received over a particular path and wherein the parameters may indicate the encryption or hash type used for encapsulating the packets. In some implementations, each value of values 530-531 may be determined by using the PMTU value and subtracting overhead associated with the encryption parameters and addressing information required for the encapsulation. PMTUs 310-311 may be learned by the interface of the gateway using discovery techniques, may be programmed by an administrator of the network, or may be learned in any other manner.

Once values 530-531 are calculated, the values may be used to replace first MSS values from computing nodes communicating using first tunnel 140 or second tunnel 141. Values 530-531 may be calculated periodically, in response to a change to the PMTU or the encryption parameters, during an IPSec rekey event, when a TCP communication is initiated for one of the tunnels, or at some other interval. Here, new parameters 510 are created to replace parameters 321. These new parameters may correspond to a different encryption standard, a different hash standard, or some other change to the encryption for second tunnel 141.

Turning to FIG. 5B, once parameters 510 are introduced, the gateway recalculates the MSS value associated with second tunnel 141. Here, based on the introduction of parameters 510, value 532 is determined and replaces value 531. Once calculated value 532 may be used for future TCP connections using second tunnel 141. In some examples, when a new MSS value is calculated, any existing tunnel may be torn down, requiring a new TCP session to be established between computing nodes. In other examples, the newly calculated value may only be applied to new TCP SYN requests.

Figure 6:
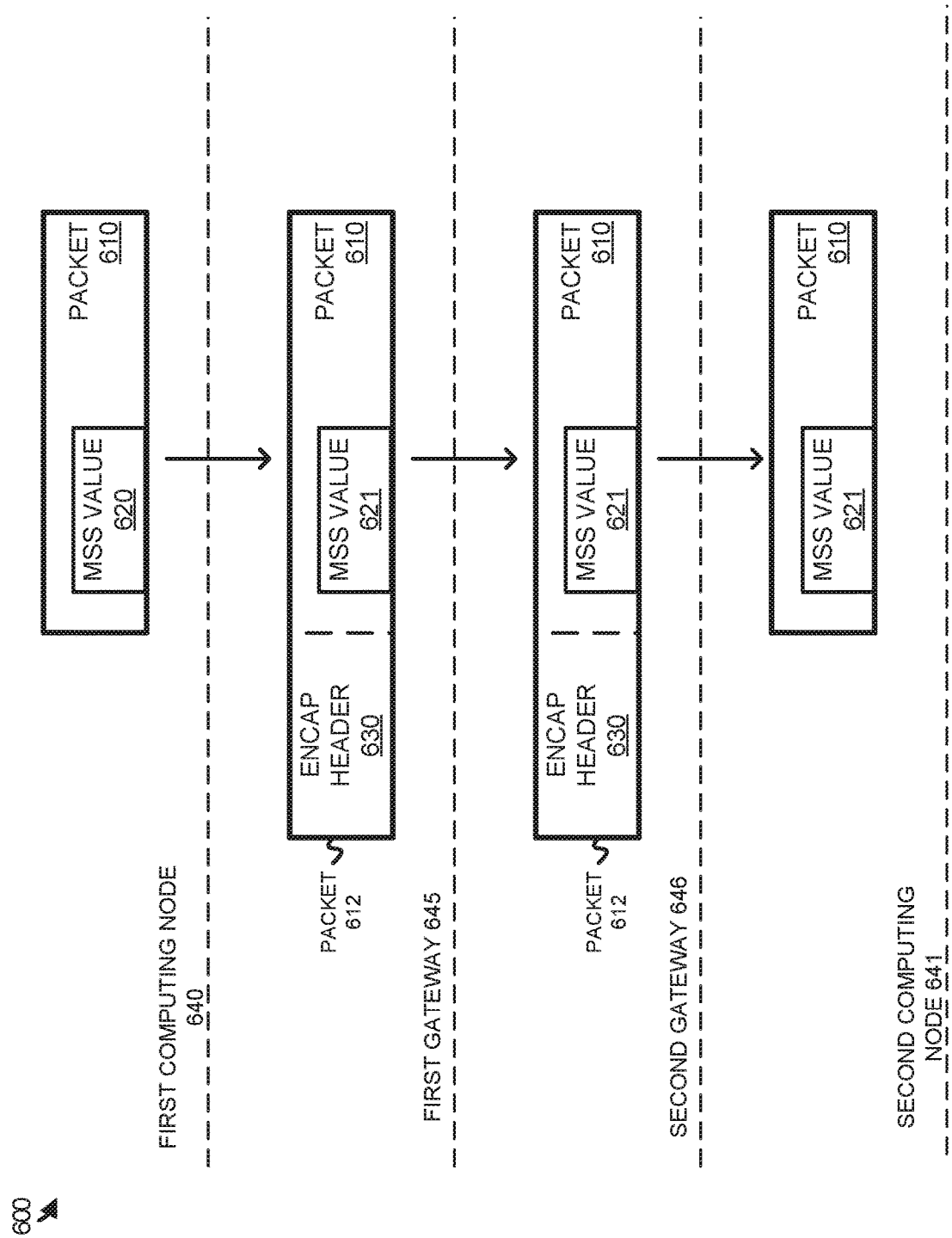
FIG. 6 illustrates an operational scenario of communicating a TCP SYN packet according to an implementation.

FIG. 6 illustrates an operational scenario 600 of communicating a TCP SYN packet according to an implementation. Operational scenario 600 includes packet 610, MSS values 620-621, packet 612 that includes encapsulation header 630 and packet 610, computing nodes 640-641, and gateways 645-646.

In operation, first computing node 640 generates packet 610 that is representative of a TCP SYN packet to establish a connection with second computing node 641. Here, packet 610 includes MSS value 620, which comprises a value in the options field for the header of the TCP SYN packet. When packet 610 is received at first gateway 645, first gateway 645 determines a tunnel associated with the packet 610 and determines a replacement MSS value 621 to replace MSS value 620. In particular, MSS value 621 may be used to account for the overhead associated with adding encapsulation header 630 to generate packet 612. In some implementations, MSS value 621 may be based on a PTMU for the connection between first gateway 645 and second gateway 646, encryption parameters associated with the tunnel, addressing overhead, or some other factor associated with the encapsulation of packet 610. Once MSS value 621 replaces MSS value 620 and packet 612 is generated, first gateway 645 communicates packet 612 to second gateway 646.

In response to receiving packet 612, second gateway 646 decapsulates the packet and forwards packet 610 to second computing node 641. Once received, second computing node 641 may generate response communications based on MSS value 621, wherein MSS value 621 may limit the size of the frames sent by second computing node 641 to computing node 640 to accommodate the overhead associated with the encapsulation header.

Although demonstrated in the example of FIG. 6 as replacing the MSS value at the outbound gateway, first gateway 645, it should be understood that the replacement or addition of MSS value 621 may occur at second gateway 646. For example, when an encapsulated packet is received by second gateway 646, second gateway 646 may determine whether the packet comprises a TCP SYN packet and determine a tunnel associated with TCP SYN packet. Second gateway 646 may also determine MSS value 621 using the PMTU and the encryption parameters associated with the identified tunnel and add MSS value 621 to the received packet by replacing a first MSS value included in the packet. In some implementations, the PTMU may be identified using discovery operations regarding the link between the gateways, may be configured by an administrator of the network, or may be determined in any other manner. Advantageously, without relying on the outbound gateway, the inbound gateway may determine the required MSS values to avoid fragmentation for packets over the tunnel. In some examples, a gateway may also provide the MSS replacement operations for both inbound and outbound TCP SYN communications to ensure that the gateway does not rely on another gateway to perform the operations.

Figure 7:
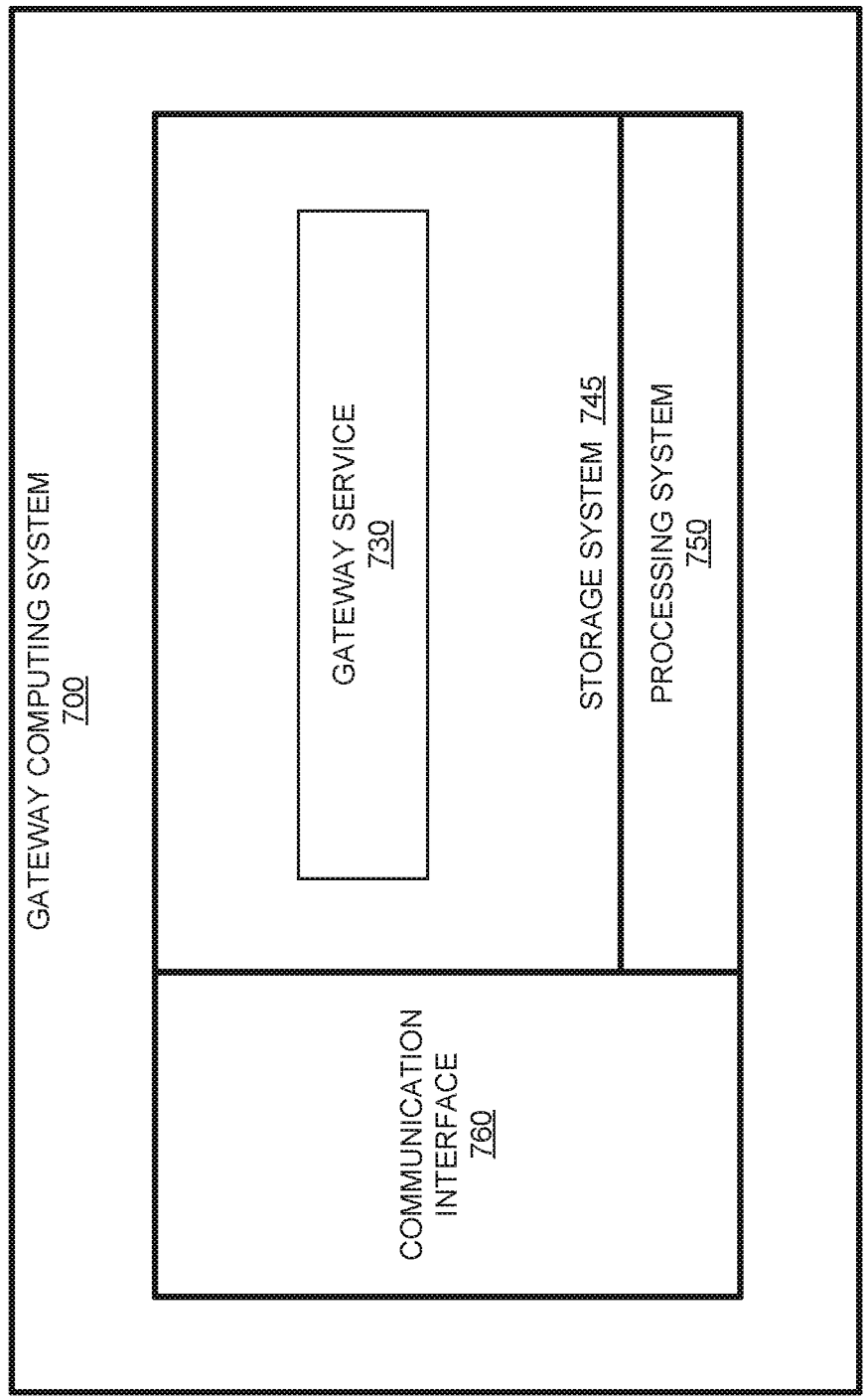
FIG. 7 illustrates a gateway computing system according to an implementation.

FIG. 7 illustrates a gateway computing system 700 according to an implementation. Computing system 700 is representative of any computing system or systems with which the various operational architectures, processes, scenarios, and sequences disclosed herein for a gateway can be implemented. Computing system 700 is an example of gateways 160-161 of FIG. 1, although other examples may exist. Computing system 700 includes storage system 745, processing system 750, and communication interface 760. Processing system 750 is operatively linked to communication interface 760 and storage system 745. Communication interface 760 may be communicatively linked to storage system 745 in some implementations. Computing system 700 may further include other components such as a battery and enclosure that are not shown for clarity.

Communication interface 760 comprises components that communicate over communication links, such as network cards, ports, radio frequency (RF), processing circuitry and software, or some other communication devices. Communication interface 760 may be configured to communicate over metallic, wireless, or optical links. Communication interface 760 may be configured to use Time Division Multiplex (TDM), Internet Protocol (IP), Ethernet, optical networking, wireless protocols, communication signaling, or some other communication format—including combinations thereof. Communication interface 760 is configured to communicate with other gateways that implement an extension of a layer two network at other computing sites or connect layer three network(s) across computing sites. Communication interface 760 may further communicate with other computing systems local to computing site 110.

Processing system 750 comprises microprocessor and other circuitry that retrieves and executes operating software from storage system 745. Storage system 745 may include volatile and nonvolatile, removable and non-removable media implemented in any method or technology for storage of information, such as computer readable instructions, data structures, program modules, or other data. Storage system 745 may be implemented as a single storage device but may also be implemented across multiple storage devices or sub-systems. Storage system 745 may comprise additional elements, such as a controller to read operating software from the storage systems. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. It should be understood that in no case is the storage media a propagated signal.

Processing system 750 is typically mounted on a circuit board that may also hold the storage system. The operating software of storage system 745 comprises computer programs, firmware, or some other form of machine-readable program instructions. The operating software of storage system 745 comprises gateway service 730 capable of providing at least operation 200 of FIG. 2. The operating software on storage system 745 may further include an operating system, utilities, drivers, network interfaces, applications, or some other type of software. When read and executed by processing system 750 the operating software on storage system 745 directs computing system 700 to operate as described herein.

In at least one implementation, gateway service 730 directs processing system 750 to obtain a TCP SYN packet from a computing node that is located at the same computing site as gateway 730. In response to obtaining the TCP SYN packet, gateway service 730 directs processing system 750 to identify a tunnel associated with the TCP SYN packet from a plurality of tunnels, wherein the gateway supports the plurality of tunnels using a common network interface. In some implementations, gateway computing system 700 may be used to extend layer two connectivity to a plurality of different computing sites, wherein the tunnels to the different computing sites may each be associated with different parameters and requirements. The parameters may comprise encryption parameters that can be used to define hash function types and/or encryption cipher types, such as an AES type for the encryption, cipher block chaining (CBC) configuration information, Encapsulating Security Payload (ESP) information, or some other information.

Gateway service 730 further directs processing system 750 to determine an MSS value for the TCP SYN packet based on tunneling overhead associated with one or more encryption parameters for the tunnel. In some implementations, different encryption configurations or parameters may require different overhead, causing MSS values to differ even when tunnels may have an equal PMTU. In some examples, the MSS value for a particular tunnel may be determined by identifying the PMTU associated with the connection between the gateways for the tunnel and subtracting the overhead required for encapsulation, wherein the overhead may be affected at least in part by the encryption parameters for the tunnel. In some examples, the MSS value may be determined in response to the TCP SYN packet being identified, however, it should be understood that the MSS values associated with the tunnels may be determined periodically, when configuration changes are implemented for one or more tunnels, in response to an IPSec rekey, or in response to some other event.

Once the MSS value for the tunnel is determined, gateway service 730 directs processing system 750 to replace a first MSS value in the TCP SYN packet calculated by the computing node with the MSS value determined by the gateway, encapsulate the TCP SYN packet in a second packet, and communicate the second packet to the corresponding destination gateway. In some examples, as the computing node may be incapable of identifying the overhead associated with the tunnel, the computing node may include an MSS value that could cause fragmentation with the use of the encapsulation overhead. As a result, gateway computing system 700 may identify the existing MSS value in the TCP SYN packet and replace the MSS value with the MSS value determined based on the overhead associated with the encapsulation parameters. In some examples, if the TCP SYN packet does not include an initial MSS value, gateway service 730 may add the MSS value to options field of the TCP SYN packet, encapsulate the packet, and communicate the encapsulated packet to the destination gateway.

Although demonstrated in the previous example as adding a new MSS value to an outgoing TCP SYN packet, gateway service 730 may provide similar operations to TCP SYN packets that are received over the internet from another computing site. In some implementations, when an encapsulated TCP SYN packet is received from a gateway at another computing site, gateway service 730 may direct processing system 750 to determine a tunnel associated with the TCP SYN packet based on addressing attributes in the packet (source internet protocol address, port, and the like) and determine an MSS value for the TCP SYN packet based on overhead required encapsulating packets associated with the tunnel. Once the MSS value is identified, the MSS value may be added to the TCP SYN packet (by replacing a first MSS value) and forwarded to the destination computing node. In some implementations, gateway service 730 may identify and add MSS values to both outgoing and incoming TCP SYN packets, such that gateway computing system 700 is not reliant on other gateways in the computing network to provide the required operations.

Returning to the elements of FIG. 1, computing site 110-112 may include computing systems capable of providing a platform for gateways 130-132 and computing nodes 120-128. These computing systems may include server computing systems, switches, routers, desktop computing systems, or some other type of computing system. The computing systems may each comprise communication interfaces, network interfaces, processing systems, computer systems, microprocessors, storage systems, storage media, or some other processing devices or software systems, and can be distributed among multiple devices. The computing systems may include software such as an operating system, logs, databases, utilities, drivers, networking software, and other software stored on a computer-readable medium. In some examples, at least a portion of computing nodes 120-128 may comprise physical computing systems, such as desktop computing systems, laptop computing systems, tablets, and the like. In some examples, at least a portion of computing nodes 120-128 may comprise virtual machines, containers, or some other virtualized endpoint.

Communication between gateways 130-132 may use metal, glass, optical, air, space, or some other material as the transport media. Communication between gateways 130-132 may use various communication protocols, such as Time Division Multiplex (TDM), asynchronous transfer mode (ATM), Internet Protocol (IP), Ethernet, synchronous optical networking (SONET), hybrid fiber-coax (HFC), circuit-switched, communication signaling, wireless communications, or some other communication format, including combinations, improvements, or variations thereof. Communication between gateways 130-132 may be a direct link or can include intermediate networks, systems, or devices, and can include a logical network link transported over multiple physical links.

The included descriptions and figures depict specific implementations to teach those skilled in the art how to make and use the best mode. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method of operating a gateway at a first computing site, the method comprising:
    obtaining a Transmission Control Protocol (TCP) synchronize (SYN) packet from a computing node at the first computing site, wherein the TCP SYN packet includes a first maximum segment size (MSS) value;
    identifying a tunnel associated with the TCP SYN packet from a plurality of tunnels to communicate the TCP SYN packet, wherein the gateway supports the plurality of tunnels using a common network interface;
    determining a MSS value for the TCP SYN packet based on tunneling overhead associated with one or more encryption parameters for the tunnel;
    replacing the first MSS value in the TCP SYN packet with the MSS value determined by the gateway;
    encapsulating the TCP SYN packet with the MSS value determined by the gateway in a second packet;
    communicating the second packet to a destination gateway via the tunnel;
    obtaining a second TCP SYN packet with a second MSS value;
    identifying a second tunnel associated with the second TCP SYN packet from the plurality of tunnels to communicate the second TCP SYN packet;
    determining a third MSS value for the second TCP SYN packet based on tunneling overhead associated with one or more encryption parameters for the second tunnel;
    replacing the second MSS value in the second TCP SYN packet with the third MSS value;
    encapsulating the second TCP SYN packet with the third MSS value; and
    communicating the encapsulated second TCP SYN packet via the second tunnel.

2. The method of claim 1, wherein the computing node comprises a virtual machine, a container, or a physical computing system.

3. The method of claim 1, wherein the second packet comprises an Internet protocol Security (IPSec) packet, a Generic Routing Encapsulation (GRE) packet, a Virtual Extensible Local Area Network (VXLAN) packet or a Generic Network Virtualization Encapsulation (GENEVE) packet.

4. The method of claim 1, wherein the one or more encryption parameters comprise a hash function type or a key encryption cipher type.

5. The method of claim 1, wherein determining the MSS value for the TCP SYN packet is further based on a Path Maximum Transmission Unit (PMTU) associated with the tunnel.

6. The method of claim 1 further comprising:
    identifying an update to the one or more encryption parameters for the tunnel; and
    in response to the update, determining a second MSS value to replace the MSS value.

7. The method of claim 1 further comprising:
    identifying an IPSec rekey event for the tunnel; and in response to the IPSec rekey event, determining a second MSS value to replace the MSS value.

8. A computing apparatus comprising:
a storage system;
a processing system operatively coupled to the storage system; and
program instructions stored on the storage system to operate a gateway at a first computing site that, when executed by the processing system, direct the processing system to:
obtain a Transmission Control Protocol (TCP) synchronize (SYN) packet from a computing node at the first computing site, wherein the TCP SYN packet includes a first maximum segment size (MSS) value;
identify a tunnel associated with the TCP SYN packet from a plurality of tunnels, wherein the gateway supports the plurality of tunnels using a common network interface;
determine a MSS value for the TCP SYN packet based on tunneling overhead associated with one or more encryption parameters for the tunnel;
replace the first MSS value in the TCP SYN packet with the MSS value determined by the gateway;
encapsulate the TCP SYN packet with the MSS value determined by the gateway in a second packet;
communicate the second packet to a destination gateway via the tunnel;
obtain a second TCP SYN packet with a second MSS value;
identify a second tunnel associated with the second TCP SYN packet from the plurality of tunnels to communicate the second TCP SYN packet;
determine a third MSS value for the second TCP SYN packet based on tunneling overhead associated with one or more encryption parameters for the second tunnel;
replace the second MSS value in the second TCP SYN packet with the third MSS value;
encapsulate the second TCP SYN packet with the third MSS value; and
communicate the encapsulated second TCP SYN packet via the second tunnel.

9. The computing apparatus of claim 8, wherein the computing node comprises a virtual machine, a container, or a physical computing system.

10. The computing apparatus of claim 8, wherein the second packet comprises an Internet protocol Security (IPSec) packet, a Generic Routing Encapsulation (GRE) packet, a Virtual Extensible Local Area Network (VXLAN) packet or a Generic Network Virtualization Encapsulation (GENEVE) packet.

11. The computing apparatus of claim 8, wherein the one or more encryption parameters comprise a hash function type or a key encryption cipher type.

12. The computing apparatus of claim 8, wherein determining the MSS value for the TCP SYN packet is further based on a Path Maximum Transmission Unit (PMTU) associated with the tunnel.

13. The computing apparatus of claim 8, wherein the program instructions further direct the processing system to:
identify an update to the one or more encryption parameters for the tunnel; and
in response to the update, determine a second MSS value to replace the MSS value.

14. The computing apparatus of claim 8, wherein the program instructions further direct the processing system to:
identify an IPSec rekey event for the tunnel; and
in response to the IPSec rekey event, determine a second MSS value to replace the MSS value.

15. A method of operating a gateway at a first computing site, the method comprising:
obtaining a first packet that encapsulates a Transmission Control Protocol (TCP) synchronize (SYN) packet at a network interface shared by a plurality of tunnels, wherein the TCP SYN packet includes a first maximum segment size (MSS) value;
identifying a tunnel of the plurality of tunnels associated with the first packet;
determining a maximum segment size (MSS) value for the TCP SYN packet based on tunneling overhead in the encapsulation header of the first packet associated with one or more encryption parameters for the tunnel;
replace the first MSS value in the TCP SYN packet with the MSS value determined by the gateway; and
communicating the TCP SYN packet with the MSS value determined by the gateway to a destination computing node;
obtaining a second packet that encapsulates a second TCP SYN packet at the network interface, wherein the second TCP SYN packet includes a second MSS value;
identifying a second tunnel of the plurality of tunnels associated with the second packet;
determining a third MSS value for the TCP SYN packet based on tunneling overhead in the encapsulation header of the second packet associated with one or more encryption parameters for the second tunnel;
replace the second MSS value in the second TCP SYN packet with the third MSS value determined by the gateway; and
communicate the second TCP SYN packet with the third MSS value to a destination computing node associated with the second TCP SYN packet.

16. The method of claim 15, wherein the destination computing node comprises a virtual machine or container.

17. The method of claim 15, wherein the second packet comprises an Internet protocol Security (IPSec) packet, a Generic Routing Encapsulation (GRE) packet, a Virtual Extensible Local Area Network (VXLAN) packet or a Generic Network Virtualization Encapsulation (GENEVE) packet.

18. The method of claim 15, wherein the one or more encryption parameters comprise a hash function type or a key encryption cipher type.

* * * * *